Jan. 9, 1940.  S. M. BEEDE, JR., ET AL  2,186,471
FRUIT PROCESSING APPARATUS
Filed June 26, 1937
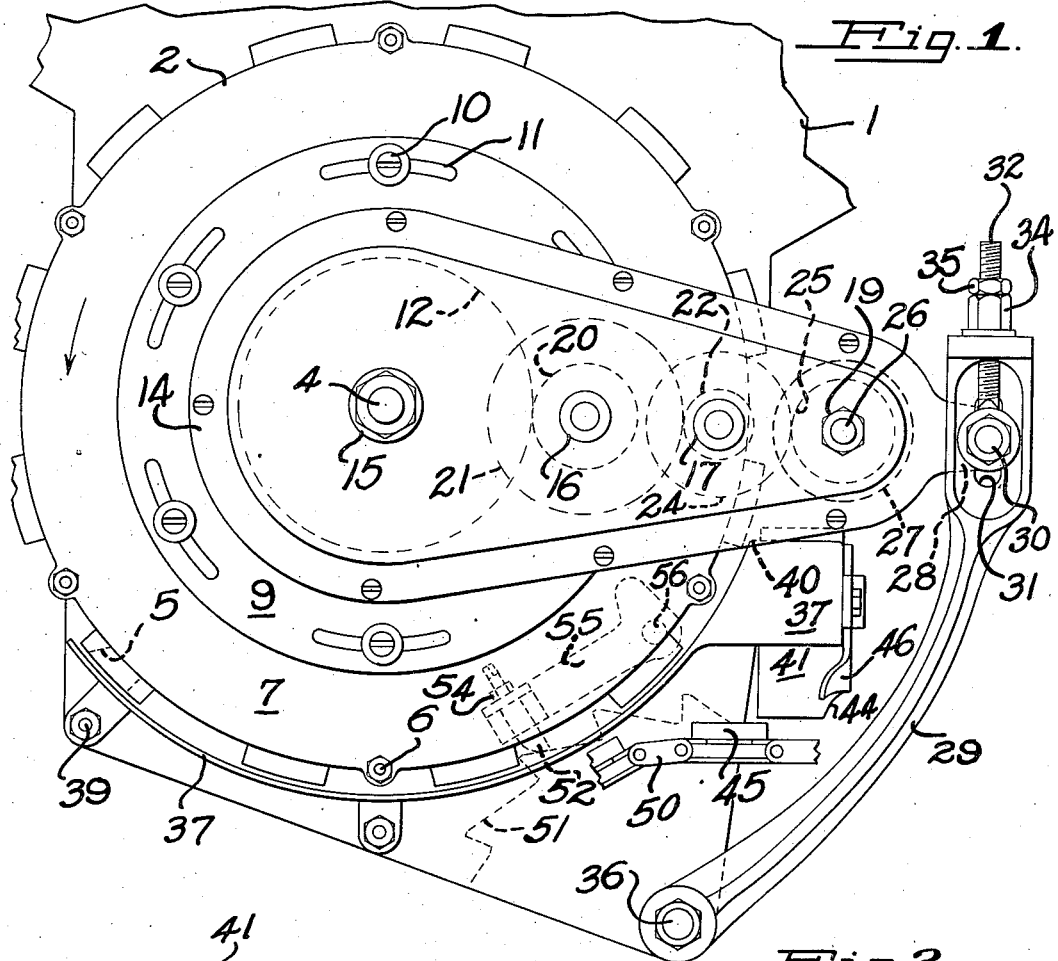
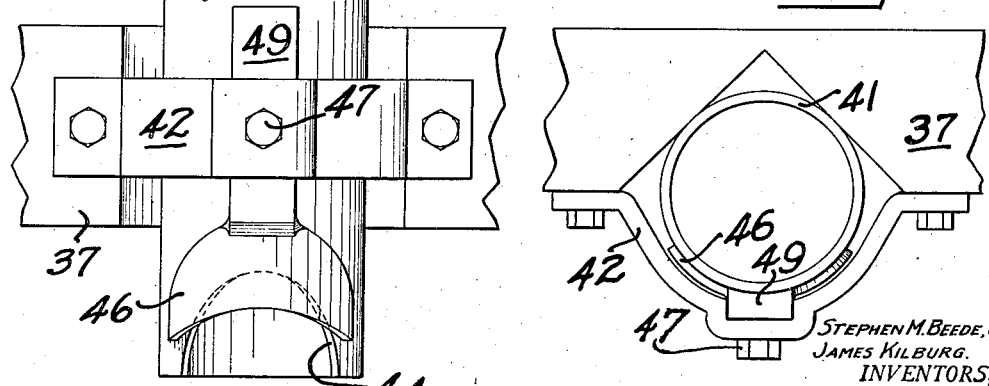

Patented Jan. 9, 1940

2,186,471

UNITED STATES PATENT OFFICE 2,186,471

FRUIT PROCESSING APPARATUS

Stephen M. Beede, Jr., San Anselmo, and James Kilburg, San Francisco, Calif., assignors to Sussman, Wormser & Co., San Francisco, Calif., a corporation of California Application June 26, 1937, Serial No. 150,576

5 Claims. (Cl. 221—135)

Our invention relates to food processing machinery, and particularly to means for distributing small fruit such as cherries in spaced relationship.

The novel apparatus here disclosed is particularly designed to serve in cooperation with the cherry treating devices disclosed in the copending application of Ellsworth W. Carroll entitled "Fruit processing apparatus," Serial No. 133,806, filed March 30, 1937, now Patent No. 2,169,353.

Briefly as to apparatus, our invention comprises a driven roller adapted to control the output of cherries from a spacing drum such as that described in the above-identified application, and an improved distributing tube cooperating therewith to guide individual cherries onto individual cups of a conveyor chain of our preferred design, together with a modified shaker bottom agitator.

These elements are shown in the drawing, wherein:

Fig. 1 is a side view of our assembly.

Fig. 2 is a detailed plan view of one of our distributing tubes.

Fig. 3 is a top view of a distributing tube.

Among the objects of our invention are: To provide improved means for feeding fruit to spacing drums; to provide easily controllable means for regulating the output of cherries from spacing drums; to provide means for preventing a plurality of cherries from emerging from each spacing drum aperture in rapid sequence; to provide means for returning cherries emerging from said spacing drum in excess of one per conveyor chain unit into said drum; to provide such means in positively driven form; to provide means for directing such emergent cherries onto said conveyor chain units; to provide such directing means in a form permitting a constant visual check on the feed; to provide such a feed in a form adjustable to accommodate differing sizes of cherries; to provide improved means for moving masses of soft, resilient fruit; to provide more satisfactory means for diverting fruit from a storing hopper into distributing drums; and to provide such mechanism in simple and easily constructed form.

Other objects of our invention will be apparent or will be specifically pointed out in the description forming a part of this specification, but we do not limit ourselves to the embodiment of the invention herein described, as various forms may be adopted within the scope of the claims.

The feeding device described in the above-mentioned application of Ellsworth W. Carroll utilized a central hopper for temporary storage of the fruit to be distributed. On either side of this hopper were disposed distributing drums, and the cherries or similar fruits were urged into these drums by the coaction of gravity and a mechanically driven shaker bottom. The agitation was accomplished by a crank linked to the shaker bottom at one end, and carrying at the other end a roller adapted to ride upon a star wheel driven in synchronism with the movements of the drums and conveyor chains.

We have found, however, that particularly when soft fruit is to be treated, there is a tendency to simply compress the bottom layers of fruit, without driving it out of the hopper and into the distributing drums.

This tendency can be overcome, we have found, by utilizing a form of star wheel having relatively abrupt changes of radius, and a follower which will transform these abrupt radial differences into very abrupt movements of the shaker bottom.

Once the fruit has been ejected from the hopper into the distributing drums, it becomes subjected to a continual rolling motion, during which the individual cherries fall into individual outlet apertures in the spacing rings which form the distributing drums. Rotation of the drums carries the cherries finally past a concentric guard which prevents them from falling out during the lower quadrants of drum travel; the outlet apertures are so formed that cherries will fall therefrom freely when past the guard. It is desired, however, to permit only one cherry to escape for each conveyor chain cup, and for this purpose a serrated guard has been used inside the drums. A more positive means is here shown which permits the desired number of cherries to be delivered to the conveyor chain, and in addition returns to the drum any that may emerge in excess of that number.

The unwanted cherries impact the driven roller, and are impelled back into the spacing ring apertures. We have found that an idle roller similarly positioned is not satisfactory, but that a definite push is necessary to force the cherries back into the apertured drum against the resistance of still other cherries which may be seeking egress. To impart a sufficient push, it is necessary to rotate the roller at relatively high speed, which we have done by means of a train of gears driven from the drum driving shaft. This train is held in a specially designed gear case which permits easy adjustment of roller clearance without interfering with continuous operation.

It has been customary to provide an inclined chute to direct the cherries emerging from the drum apertures onto the chain, and to terminate the lower end of the chute by a movable gate actuated in synchronism with the movements of the chain to release a cherry directly into each cup. While such a mechanism is very satisfactory, it has been found difficult in manufacturing to locate properly the keyways on the shaft carrying the release mechanism, and hence to secure exact synchronization, and it has been found that occasional sub-size cherries will be released in addition to the desired unit, such extra units falling on the conveyor table and not being carried to the pitters.

In addition, the resilience of the rubber cups utilized in our conveyor chain, the preferred form for which may be found by reference to the Carroll application cited supra, is sometimes sufficient to cause a cherry to bounce out of its position on the chain.

The present invention is designed to eliminate these difficulties by redirecting such cherries as may bounce onto their respective chain cups, providing positive means for insuring the release of but one cherry per cup, providing a visual check on the operation and providing easily adjustable means for insuring proper registry of spacing drum holes and chain cups. The operative parts include a transparent cylindrical tube down which the cherries may fall, an adjustable opening at the bottom to control passage onto the conveyor chain, and an adjustable and supporting plate for the drums.

The more detailed elements of our invention may be understood by reference to the drawing.

In Fig. 1 we have shown a side view of a distributing drum such as described in the Carroll application referred to supra. A suitable framework, not visible in the figure, supports a hopper 1, in which fruit is poured.

On either side of hopper 1 is supported a distributing drum 2, carried by a shaft 4. Drum 2 is composed of a series of spacing rings having evenly spaced apertures 5 radially disposed thereabout. The exact structure of these rings forms no part of the present invention, but is fully covered in the Carroll application cited supra. The rings are held together by a number of evenly distributed bolts 6 which hold them to an end plate 7. The end plate 7 is of annular form, and is adjustably secured to a circular central end plate 9 by a number of screws 10 passing through concentric slots 11 in central plate 9. A central hub, not shown, formed integral with plate 9, maintains the drum on shaft 4 close to, but not touching, the side of hopper 1, so that the shaft may rotate the drum freely with respect to the hopper, yet restrain the cherries from falling out along the adjacent border.

In operation, the screws 10 may be loosened and end plates 7 and 9 rotated until proper registry of the discharge apertures is obtained, such that each cherry will be discharged from its aperture just in time to fall centrally onto a conveyor chain cup.

A gear 12 is fixed on and driven by the same shaft 4 which drives the drum 2. A gear case 14 is carried about gear 12 by suitable journal bearings 15. A series of similar journal bearings 16, 17 and 19, are carried by gear case 14, and rotatably support a series of pinions and gears, schematically indicated in the drawing, 20 and 21, 22 and 24, and 25, coacting in sequence so that while gear 12 rotates at a slow speed, gear 25 revolves on the order of twenty times as rapidly.

Gear 25 is keyed to a shaft 26 which extends across the drum 2, hopper 1, and across the similar drum positioned on the opposite side of the hopper, where it is rotatably supported by a journal bearing fixed in a case, not visible in the drawing, similar to gear case 14 as to shape and dimensions, and similarly journaled about shaft 4, but lacking the gear train. A rubber roller 27 is formed upon shaft 26 on the portions thereof opposite the drums.

The outer end of gear case 14 terminates in an arm 27 which engages an adjusting and positioning arm 29 through the medium of a bolt 30. Bolt 30 threadably engages arm 27 and passes through a slot 31 in arm 29, its position within the slot being determined by an adjusting screw 32, nut 34 and locknut 35, said screw 32 being longitudinally adjustable in slot 31.

We have shown the lower end of arm 29 supported by a simple bearing on a shaft 36. It is obvious, however, that any pivotal mounting which would permit a slight rotation of arm 29 to accommodate different positions of bolt 30 in slot 31 would be fully equivalent to this type of lower support. A similar supporting arm with adjusting screw is positioned at the opposite side of the machine to engage the gearless case supporting the opposite end of shaft 26 carrying the rubber roller.

A guard 37 formed concentrically with drum 2 is supported on the under side thereof by the hopper and associated framework, being attached thereto by bolts 39. Cherries within drum 2 fall by gravity into the apertures 5, but are restrained by guard 37 from falling out until the particular drum aperture revolves past the guard edge 40.

At this point one cherry will be permitted to fall into a monitoring tube 41 alined with each spacing ring component of the drum 2. By the adjusting means described above, the clearance between the aperture 5 and rubber roller 27 is set to permit one cherry to fall into the tube 41. A second cherry, by virtue of the constant rotation of drum 2, would encounter roller 27 and receive therefrom a "kick" which will send it, and any potentially emergent cherries behind it, back into the drum, to be redistributed in the drum apertures.

Monitoring tubes 41 are formed of a heavy, transparent material of the "plastic" type, such being easily cleaned and not subject to breakage under ordinary working conditions. The transparent nature of the tubes allows the machine operator to detect possible clogging.

The tube may be adjusted as to chain clearance by loosening strap 42 which fixes the tube to the supporting guard 37. At the bottom, a segment has been removed to leave an archway 44 under which the cherries may easily pass after settling in their cups 45 on the chain. The size of the arch is controlled by slidable cover plate 46, the position of which is controlled by a setscrew 47 threadably engaging supporting strap 42 and a cover plate supporting element 49. Adjustment of this cover plate prevents bouncing cherries from jumping out the bottom of the monitoring tube.

Shaft 36 drives the conveyor chain 50 carrying cups 45 through the medium of a gear, not shown. Suitable gear linkages connect this shaft and drum driving shaft 4 to a common power supply, so that all moving parts are properly synchronized. Shaft 36 also carries a star wheel 51, which wheel is modified to approximately ratchet form. Each tooth of wheel 51 presents a gradual rise, terminating in a very abrupt drop, to an engaging dog 52 adjustably positioned by a locknut 54 on a crank 55. A shaft 56 pivotally supports crank 55, and through suitable levers, not shown, the movements of the dog 52 are transmitted to the shaker bottom of hopper 1. The shaker bottom is not here illustrated, having been fully described and claimed in the Carroll application cited supra. By means of the improved agitating mechanism here claimed, we are able to produce a more rapid and violent movement of the shaker, and hence are able to deliver cherries more regularly and satisfactorily from the hopper to the drums.

In short, we have here described means for more effectively controlling the distribution of cherries onto a conveying chain in proper spaced relation from a central hopper, means for returning to spacing drums those cherries delivered therefrom in excess of the required rate, and more accurate means for centering the cherries in conveyor cups.

It is obvious that our device is equally applicable to handling many other fruits, and we do not wish to be limited to cherries alone. It is also apparent that slight modifications of our invention may be made, within the province of skilled mechanics, without departing from the essential nature and claims here presented.

We claim:

1. In combination, a frame, a shaft journaled through said frame, a spacing drum fixed to said shaft, a roller positioned axially parallel to said shaft and spaced from the discharge point on said drum, by a distance sufficient to permit discharge of a single item at a time, a resilient surface formed upon said roller opposite said drum, and a gear drive acting to drive said roller from said shaft at a rate of rotation high in relation to rotation of said shaft.

2. In combination, a frame, a shaft journaled through said frame, a spacing drum fixed to said shaft, said spacing drum comprising a circular member centrally fixed to said shaft and a spacing ring fixed to said member concentrically about said shaft, said ring having a plurality of radial apertures spaced symmetrically therethrough, and means for returning through said spacing ring apertures items delivered in excess of a desired number, said means comprising an adjustable supporting arm positioned at each side of the said frame, casings journaled about each end of said shaft, and said casings having their opposite ends adjustably connected to said supporting arms, a roller journaled in said casings parallel to and separated from said drum, a resilient surface formed upon a portion of said roller facing said drum, a gear drive so arranged within one of said casings as to drive said roller from said shaft at a rate of rotation high in relation to said shaft.

3. In combination, a frame, a shaft journaled through said frame, a spacing drum fixed to said shaft, said spacing drum comprising a circular member centrally fixed to said shaft and a spacing ring fixed to said member concentrically about said shaft, and said ring having a plurality of radial apertures spaced symmetrically therethrough, means for returning through said spacing ring apertures items delivered in excess of a desired number, said means comprising supporting arms positioned at each side of said frame, a casing journaled about each end of said shaft and adjustably engaging said supporting arms, a roller rotatably journaled in said casings parallel to said shaft and separated by a fixed distance from said drum, said roller having a resilient surface facing said drum, a gear drive disposed within one of said casings arranged to drive said roller from said shaft at a relatively high rate of rotation, means for so adjusting said roller-supporting casings relative to said supporting arms as to control the degree of arc of rotation in which individual items may leave said drum through said radial apertures.

4. In combination, a frame, a shaft journaled through said frame, a spacing drum fixed to said shaft, said spacing drum comprising a circular member centrally fixed to said shaft and a spacing ring fixed to said circular member and concentrically about said shaft, said spacing ring having a plurality of evenly spaced radial apertures formed therein, shield means formed concentrically about the lower portion of said drum, and determining at one edge thereof, the point of discharge of items carried by said spacing drum, and a driven roller spaced from said discharge point a distance just sufficient to permit discharge of a single item at a time from said drum.

5. A device for preventing delivery from an apertured rotating fruit spacing device of fruit in excess of a desired rate, comprising a resiliently-surfaced roller driven at a speed of rotation high in relation to that of said spacing device and adjustably positioned relative thereto, said roller being supported in relation to said spacing device by a pair of arms pivotally fixed thereto and a pair of casings rotatably journaled about a main rotation-producing shaft therein, a gear train journaled within one of said casings adapted to drive said roller from said main shaft, and means for adjustably connecting each of said arms to one of said casings.

STEPHEN M. BEEDE, JR.
JAMES KILBURG.